United States Patent [19]

Mounts et al.

[11] 4,060,834

[45] Nov. 29, 1977

[54] PROCESSOR FOR INCREASING THE RUN-LENGTH OF DIGITAL SIGNALS

[75] Inventors: Frank William Mounts, Colts Neck; Arun Narayan Netravali, Matawan, both of N.J.

[73] Assignee: Bell Telephone Laboratories, Incorporated, Murray Hill, N.J.

[21] Appl. No.: 734,384

[22] Filed: Oct. 21, 1976

[51] Int. Cl.² .................................................. H04N 1/00
[52] U.S. Cl. ...................................................... 358/261
[58] Field of Search ................ 358/133, 135, 260, 261

[56] References Cited
U.S. PATENT DOCUMENTS

| | | | |
|---|---|---|---|
| 3,769,453 | 10/1973 | Bahl et al. | 358/261 |
| 3,937,871 | 2/1976 | Robinson | 358/261 |

Primary Examiner—Richard Murray
Attorney, Agent, or Firm—Richard J. Roddy

[57] ABSTRACT

A facsimile scene typically includes a plurality of lines, each line having a plurality of picture elements (pels). Often, pel signals are adaptable for run-length coding, a run being one or more successive pels having the same brightness level. To increase the length of a run and hence to permit more efficient use of a transmission link between transmitter and receiver, a processor arrangement is disclosed for permuting a measure of the pel signals responsive to a reference signal. The reference signal is a calibration signal. The measure is an error signal for indicating a difference between the current pel signal and a prediction thereof. In an illustrative bi-level facsimile system embodiment, if the calibration signal is a logic one, the error signal is loaded beginning at one end of a memory; if the calibration pel signal is a logic zero, the error signal is loaded beginning at the other end of the memory. The loaded permuted error signal having an increased run length is then sequentially read from one end of the memory for extension to a state of the art run-length coder.

6 Claims, 3 Drawing Figures

FIG. 2

| ROW | SIGNAL | PEL NUMBER | | | | | | | |
|---|---|---|---|---|---|---|---|---|---|
| | | 1 | 2 | 3 | 4 | 5 | 6 | 7 | 8 |
| 1 | PREVIOUS LINE | 1 | 1 | 0 A | 1 B | 1 C | 0 | 1 | 1 |
| 2 | CURRENT LINE | 1 | 0 | 0 D | 1 X | 0 | 0 | 0 | 1 |
| 3 | PREDICTION | 1 | 1 | 0 | 1 | 1 | 0 | 1 | 1 |
| 4 | PROBABILITY OF CORRECT PREDICTION | 1.0 | 0.85 | 1.0 | 0.74 | 0.85 | 1.0 | 0.74 | 1.0 |
| 5 | PREDICTION ERROR | 0 | 1 | 0 | 0 | 1 | 0 | 1 | 0 |
| 6 | REORDERED PREDICTION ERROR | 0 | 0 | 0 | 0 | 1 | 1 | 0 | 1 |

FIG. 3

| ROW NUMBER | FOUR-TUPLE STATE ABCD | PREDICTION | ESTIMATE OF PROBABILITY OF CORRECT PREDICTION |
|---|---|---|---|
| 0 | 0000 | 0 | 0.96 |
| 1 | 0001 | 1 | 0.63 |
| 2 | 0010 | 0 | 0.83 |
| 3 | 0011 | 1 | 0.84 |
| 4 | 0100 | 0 | 1.00 |
| 5 | 0101 | 1 | 1.00 |
| 6 | 0110 | 1 | 0.74 |
| 7 | 0111 | 1 | 1.00 |
| 8 | 1000 | 0 | 1.00 |
| 9 | 1001 | 0 | 0.71 |
| 10 | 1010 | 0 | 1.00 |
| 11 | 1011 | 0 | 0.86 |
| 12 | 1100 | 0 | 0.99 |
| 13 | 1101 | 1 | 0.85 |
| 14 | 1110 | 0 | 0.55 |
| 15 | 1111 | 1 | 0.99 |

PROCESSOR FOR INCREASING THE RUN-LENGTH OF DIGITAL SIGNALS

BACKGROUND OF THE INVENTION

This invention relates to digital communication systems and, more particularly, to a processor arrangement employable in such systems for increasing the run length of digital signals.

In conventional facsimile systems, a picture image includes a plurality of lines, each line having a plurality of picture elements. Usually, within a facsimile system transmitter, a coder digitally encodes a voltage proportional in amplitude to the level of brightness of a picture element (pel). The encoded voltage, hereinafter called the pel signal, is transmitted to a receiver where it is decoded and a facsimile of the picture image assembled.

In facsimile systems using predictive coding, a predictor error signal, rather than the current pel signal, is so transmitted. One method of predictive coding is disclosed in J. S. Wholey, "The Coding of Pictorial Data," *IRE Transactions on Information Theory*, Vol. IT-7, No. 2 (April, 1961), pp 99–104. According to the prior art, a survey of pictures representative of the class of pictures to be coded is made. One class might include pictures of circuit diagrams; a second class might include pictures of single-spaced, typed manuscripts, etc. The purpose of the survey is to ascertain for each class the relative frequency that a pel signal will be a particular level of brightness, given the brightness level of each pel in a neighborhood thereof. The neighborhood is usually a prefixed set of nearby, prior pels. For example, in a class of bi-level pictures, the survey may ascertain the relative frequency that a black pel follows a particular neighborhood. Exemplary of a bi-level picture is a typed manuscript. Bi-level facsimile systems allow a descriptive convenience arising in part because bi-level brightness levels may be coded and explained in terms of a single bit for each pel, typically a logic zero or logic one signal for coding a black or white brightness level, respectively. As a consequence of the survey, given a neighborhood of a pel, the most likely brightness level is assigned as a unique prediction of the current pel. In the prior art, the prediction is compared with the current pel signal. If the prediction and pel signal are identical, then a first logic signal, e.g., a logic zero, is transmitted to the receiver; otherwise a second logic signal, e.g., a logic one, is so transmitted. Inasmuch as the prediction is usually correct, a sequence of logic zeros is transmitted. The resultant repetition of like signals, known in the art as a run, leads to inefficient use of the transmission link between transmitter and receiver. To mitigate against the inefficient use, various run-length coding arrangements are known. A typical run-length coder extends two quanta of data to the receiver: one, the brightness level and the other the length of the run, e.g., a count of the number of sequential picture elements having the same brightness level. Of course, a run of length one is possible; however, as the run-length increases, more efficient use of the transmission link is possible.

Accordingly, an object of our invention is to increase the length of a run in a facsimile system.

SUMMARY OF THE INVENTION

This and other objects of our invention are achieved by processing the facsimile data before the data are run-length coded. Our processor arrangement permutes a measure of the facsimile data responsive to a reference signal. The reference signal is a calibration signal. The measure is an error signal for indicating a difference between the current input signal and a prediction thereof. Thereby, the run-length of the permuted signal is increased to permit more efficient use of the transmission link between transmitter and receiver.

BRIEF DESCRIPTION OF THE DRAWING

Our invention should become fully apparent when taken in conjunction with the following detailed description and the accompanying drawing in which:

FIG. 2 illustrates a neighbor of a picture element and includes information useful in describing an example of a process embodied within the processor of FIG. 1; and FIG. 3 illustrates the results of a survey to obtain a predictor and reference signal generator usable in the processor of FIG. 1.

DETAILED DESCRIPTION

Figure 1:
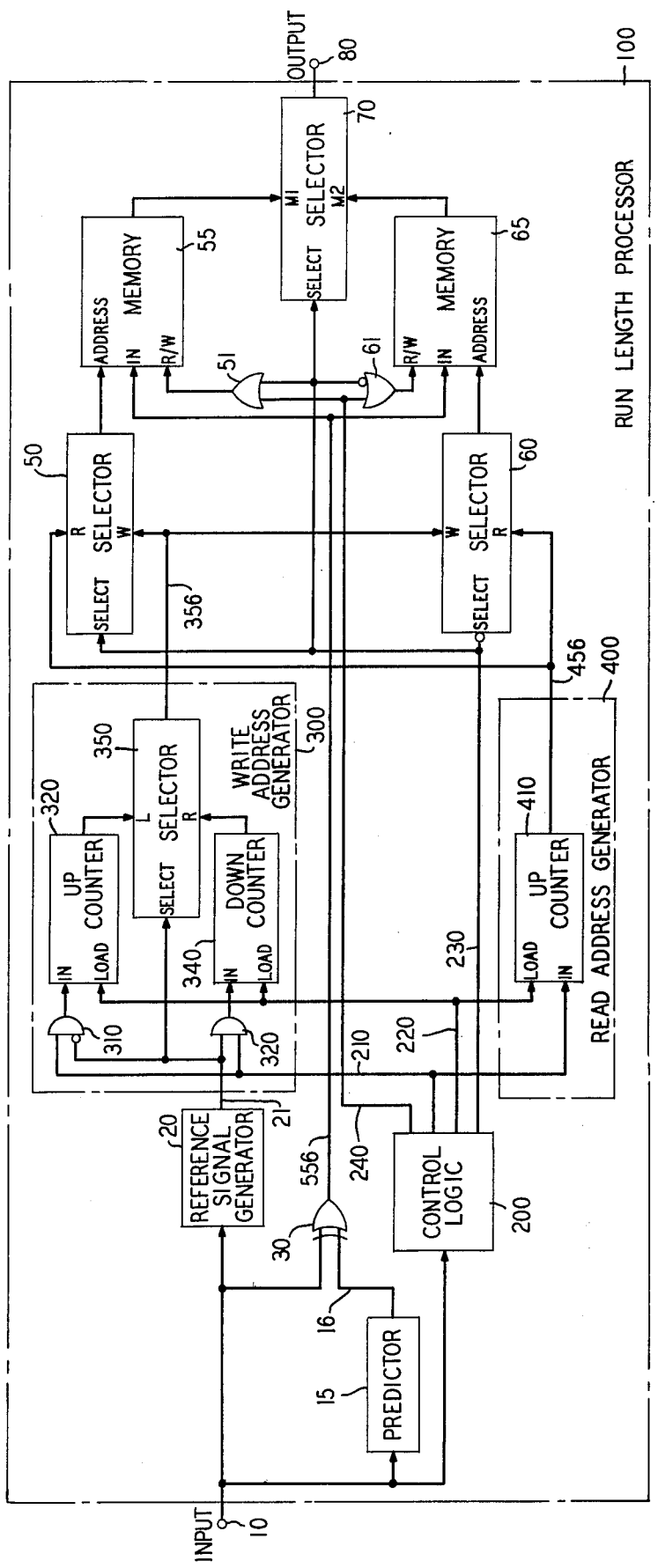
FIG. 1 is a schematic block diagram illustrative embodiment of a processor in accordance with the principles of our invention.

An illustrative embodiment incorporating the principles of our invention, schematically shown in FIG. 1 as run-length processor 100, increases the length of a run. Generally, digital facsimile picture element (pel) signals are provided to input terminal 10. A measure of the pel signals is then reordered by processor 100 responsive to a reference signal. The measure may be an error signal for indicating a difference between the current pel signal and a prediction thereof. Hereinafter, we usually refer to the error signal rather than the broader measure, the latter being disclosed in concurrently filed application E. G. Bowen et al., Ser. No. 734,387. Thus in reordering, the error signals are permuted so that like error signals are usually grouped together. The reordered error signals are thereafter supplied to output terminal 80 for extension to a state-of-the-art run-length coder for transmission to the receiver. Inasmuch as the reordering increases the run-length by advantageously grouping together pel signal prediction errors, more efficient use of the transmission link between transmitter and receiver is possible.

Before particularly describing the operation of processor 100, we divert for a moment to describe the error signal and the reference signal. First, the error signal. Referring to the first row of FIG. 2, a previous line of eight picture elements is assumed to include, from left to right, pel signals labelled A, B, and C having logic signal values zero, one, and one respectively. As to the current line shown in the second row, we assume X to be the current pel and the pel labelled D to be the immediately prior pel. For purposes of illustration, we select as the neighborhood of current pel X, the nearby, prior pels A, B, C and D. Accordingly, for each current pel X in a picture, a neighborhood may be taken as a four-tuple (A, B, C, D). Each neighborhood four-tuple represents one of up to 16 four-tuple states. A survey of pictures representative of the class to be coded leads to the determination of the relative frequency that a current pel X will be a particular brightness level given the state of its neighborhood. In statistical terms, the relative frequency is an estimator of the probability of the current pel X being that level. FIG. 3 includes exemplary results of a survey of single-spaced, typed manuscripts. The left column includes a row number, zero through 15, for each of the 16 four-tuple states identified in the second column. Column 3 includes the predicted value of the current pel X given the state of the neighborhood shown in the second column. The fourth column includes the relative frequency of the predicted brightness level of column 3 given the state shown in column 2. That is, column 4 includes an estimate of the probability that the predicted signal is correct given the state in column 2. In addition, for the respective end points of a picture line, the current pel is transmitted, hence its probability of being correct is unity. Accordingly, returning to FIG. 1, predictor 15 of processor 100 may then include a standard tapped, delay line to obtain the prior pel signals A, B, C and D for defining a state and a random access memory responsive to the state for extending the prediction to output lead 16.

Second, the reference signal. Again referring to FIG. 3, the probability estimate illustrated in column 4 includes a range of estimates between 0.55 and 1.0. Certainly, the higher the probability, the more confidence is to be expected in the correctness of the prediction, or stated alternatively, the less likely the current pel signal and its predictor will differ. Hence, our reference signal is a measure of our confidence in correctly predicting the current pel. Therefore, our reference signal is a calibration signal. Although many calibration levels are clearly possible, e.g., consider as four calibration levels in "excellent" level, a "good" level, a "fair" level, and a "bad" level, for purposes of illustration we discuss only two calibration levels, called "good" and "bad" respectively. Illustratively, if the estimate of the probability of a correct predictor exceeds a prefixed threshold, say 0.85, the predictor is considered a "good" predictor; otherwise the predictor is considered a "bad" predictor. Fortuitously, our bi-level calibration signal is codable as a logic zero, if "good," a logic one if a "bad" predictor. Accordingly, returning to FIG. 1 reference signal generator 20 may then also include a standard tapped, delay line to obtain the prior pel signals A, B, C and D for defining a state and a random access memory responsive to the state for extending the bi-level calibration signal to output lead 21 thereof.

Now returning to a description of illustrative processor 100 of FIG. 1 wherein the run-length of digital signals is increased by reordering the error signal responsive to the reference signal. As mentioned our reference signal is a calibration signal related to the confidence of the predicted signal and hence depends upon the neighborhood of the pel signal to be predicted. As mentioned, our neighborhood is related to prior pel signals. Inasmuch as the prior pel signals will usually have been transmitted to the receiver before or during the current reordering interval, additional control signals need not be transmitted to the receiver. Hence, our reference signal has a further advantage of permitting a less complex receiver design for assembly of the facsimile picture image from the reordered signal.

Broadly, in our illustrative embodiment, during a first reordering interval, each pel signal provided to input terminal 10 is compared by way of exclusive OR gate 30 with a prediction thereof supplied by predictor 15. If in the comparison, the current and predicted signals are identical, a logic zero error signal is extended over lead 556 from gate 30; otherwise, a logic one is so extended. The error signal is temporarily buffered by being written in either random access memory 55 or 65. The cell address therefor is provided over lead 356 by a buffer address generator, here write address generator 300. Fortuitously, generator 300 does not usually provide contiguous addresses, but rather provides a write address which is permuted responsive to the reference signal extended thereto over lead 21 from reference signal generator 20. As a result, the error signal is written in the memory in reordered fashion. Later, during a second reordering interval, the reordered error signal is sequentially read from the memory, the consecutive cell address being provided over lead 456 by read address generator 400. The read reordered signal is then supplied to output terminal 80 for extension to the state-of-the-art run-length encoder.

Before continuing with the description of our illustrative embodiment, we first describe, by use of an example, a process embodied therein. The example is summarized in FIG. 2. Let a reordering interval be taken as one line of the picture. Further, let the illustrated picture line consist of eight picture elements. The corresponding pel signals, columned left to right in the usual manner of a picture line, are identified by pel numbers one through eight. Rows one and two, labeled respectively, "previous line" and "current line" include bi-level pel signals for, respectively, the previous line and the current line of the picture. The third row includes a prediction of the current pel signal using the aforedescribed process in connection with the survey results illustrated in FIG. 3. The fifth row includes an error signal for each pel. It is noteworthy that, but for pel numbers 2, 5 and 7, the prediction is correct for all picture elements. In addition, we find it convenient to assume each memory 55 and 65 to be an eight-cell memory cell and to think of the memory as a row of eight cells. That allows us to speak of writing an error signal in the left or right end of the memory, responsive to the reference signal on lead 21. In particular, if the bi-level reference signal is a logic one, the error signal is written commencing at the right end of the memory; if the reference signal is a logic zero, the error signal is written commencing at the left end of the memory. The writing continues from each end of the memory toward its opposite end, i.e., toward the left or right end, respectively. Arbitrarily, we assume the prefixed threshold for our bi-level calibration signal to be 0.85. That is, if the probability of correct prediction exceeds 0.85, the predictor is "good" and a logic zero calibration signal is provided to lead 21 by reference signal generator 20; otherwise, a logic one "bad" calibration signal is so provided. Thus, in FIG. 2, prediction error bit one, appearing in the fifth row as a logic zero, responsive to a "good" logic zero calibration signal bit one, is written in the left end, i.e., in cell one of the memory as shown in the sixth row. However, inasmuch as the writing commences at the right end for a "bad" logic one calibration signal and continues toward the left end, error signal bit two, here a logic zero, is written in cell eight of the memory. The writing continues for each prediction error signal during the reordering interval. Progressively the memory is loaded from the respective ends toward the respective opposite end. Advantageously, it is clear that according to the principles of our invention, the length of a run within the current line has been increased from a length three in the second row to a length four in the sixth row.

Now we return to the description of our illustrative embodiment in FIG. 1 which incorporates the aforedescribed process for reordering the error signal. More narrowly, each pel signal detected at input terminal 10 is jointly provided to an input of reference signal generator 20, an input of exclusive OR gate 30, an input of control logic 200 and an input of predictor 15. An output of predictor 15 is extended to a second input of exclusive OR gate 30. The error signal output of exclusive OR gate 30 is provided over lead 556 to the IN inputs of memories 55 and 65. As previously mentioned, reference signal generator 20 and predictor 15 can include simple tapped, delay line, random access memory apparatus to provide, responsive to a neighborhood state, a calibration signal and a predictor signal, respectively. Hence, the calibration signal output of generator 20 is extended over lead 21 to write address generator 300 and therewithin jointly to a first input of AND gate 330 and an inverting first input of AND gate 310. A second input of each AND gate is provided by control logic 200 over lead 210. The second input is a timing signal logic one provided in a straightforward manner responsive to the detection at terminal 10 of each input pel signal; otherwise, a logic zero is so provided. Thereafter, if the bi-level calibration signal is a logic one, down-counter 340, initialized over cable 220 at the start of the reordering interval to contain the right-end address of the memory, is decremented. On the other hand, if the calibration signal is a logic zero, up-counter 320, initialized over cable 220 also at the start of the reordering interval to contain the left-end memory address, is incremented. The left or right address is supplied from an output of counter 320 or 340, respectively, to a L or R input of selector 350. The left or right address is selected by selector 350 responsive respectively to the detection of a logic zero or logic one calibration signal at a SELECT input thereof. Thereby, the write address is permuted. The permuted address is thereafter supplied over lead 356 jointly to a write (W) input of each of selectors 50 and 60 for an extension to an ADDRESS input of one of memories 55 and 65.

As to which memory the permuted write address is extended, a memory is written or read during alternate reordering intervals. Specifically, during a first reordering interval, memory 55, for example, is written while memory 65 is read; then, during the next interval, the memory roles are reversed. The memory to be written or read is enabled for writing or reading responsive to a binary signal extended by control logic 200 over lead 230 to respective first inputs of OR gate 51 and 61. An output of each OR gate is provided to a respective R/W memory input. To use alternating memories, the R/W input of one memory, here memory 65, is inverted by way of an inverting first input to OR gate 61. Of course, to eliminate writing or reading the improper memory cell, the signal timing at the inputs thereof must be consistent with the requirements of the standard random access memory that is used. However, such signal timing, here provided over lead 240 to second inputs of OR gates 51 and 61, is well known and need not be described in detail to understand the broad principles of our invention. More particularly, a memory is enabled for writing responsive to the detection of a logic zero at the R/W input thereof and for reading responsive to a logic one thereat. Coincidentally, the binary signal on lead 230 is jointly extended to a SELECT input of each of selectors 50, 60 and 70. Thereby, a logic zero signal on lead 230 enables selector 50 to extend the write address provided over lead 356 to the ADDRESS input of memory 55 and enables memory 55 by way of a logic zero at its R/W input to write the pel signal on lead 556 in the appropriate end of a memory. Concurrently, and pointing out the alternating memory roles during alternate reordering intervals, the logic zero signal on lead 230 is also extended to the SELECT input of selector 70. Responsive thereto, an output of memory 65, the memory then being read, is extended through input M2 of selector 70 to output terminal 80. In that respect, the read address is provided by up-counter 410 of read address generator 400 over lead 456 through selector 60 to the ADDRESS input of memory 65. Specifically, at the start of the reordering interval, up-counter 410 is initialized over cable 220 to contain the left-end read memory address and is thereafter incremented responsive to each logic one timing signal extended thereto over lead 210. Thus, in our illustrative embodiment, although the write address is permuted when the input pel signal is loaded in the memory, the read address is not so permitted. Rather, the reordered signal is read sequentially from the cell and provided to output terminal 80. Thereby, the error signal is reordered responsive to the calibration signal to increase the run-length.

Although the invention has been described and illustrated in detail with respect to a processor for permuting bi-level facsimile signals, it is to be understood that the same is not by way of limitation. The spirit and scope of our invention is limited only by the terms of the appended claims.

We claim:

1. Apparatus for increasing the run-length of a digital signal comprising
    an input terminal adapted to receive a first signal,
    predicting means for providing a prediction of said first signal,
    means responsive to said predicting means for supplying a reference signal,
    means for comparing said first signal and said prediction to obtain a signal measure,
    means responsive to said response signal for permuting said signal measure, and
    means for extending said permuted signal measure to an output terminal.

2. The apparatus defined in claim 1 wherein said reference signal supplying means includes means for generating a calibration signal, said calibration signal being a measure of confidence of said prediction.

3. The apparatus defined in claim 1 wherein said permuting means includes means for buffering said signal measure in a reordered manner.

4. The apparatus defined in claim 3 wherein said buffering means includes
    a buffer,
    a permuting buffer address generator, and
    means for selecting said buffer responsive to a permuted buffer address.

5. The apparatus defined in claim 4 wherein said extending means includes means for coupling said signal measure through said buffer to said output terminal.

6. A method for increasing the run-length of a digital signal comprising the steps of:
    receiving a first signal,
    providing a prediction of said first signal,
    comparing said first signal and said prediction to obtain a signal measure,
    generating a reference signal,
    permuting said signal measure responsive to said reference signal, and
    extending said permuted signal measure to an output terminal.

* * * * *

UNITED STATES PATENT AND TRADEMARK OFFICE
CERTIFICATE OF CORRECTION

PATENT NO. : 4,060,834
DATED : November 29, 1977
INVENTOR(S) : Frank W. Mounts and Arun N. Netravali It is certified that error appears in the above-identified patent and that said Letters Patent are hereby corrected as shown below:

In claim 1, line 6, delete "responsive to said predicting means" and substitute therefor --responsive to said first signal--.

line 10, delete "response signal" and substitute therefor --reference signal--.

Signed and Sealed this

Fourteenth Day of November 1978

[SEAL]

Attest:

RUTH C. MASON
Attesting Officer

DONALD W. BANNER
Commissioner of Patents and Trademarks